United States Patent
Akazawa

Patent Number: 5,664,423
Date of Patent: Sep. 9, 1997

[54] ATTACHMENT FOR VEHICLE AIR-CONDITIONING APPARATUS

[76] Inventor: Yasumasa Akazawa, 2-8-14, Higashi-shinmachi, Matsubara, Osaka, Japan

[21] Appl. No.: 660,274

[22] Filed: Jun. 7, 1996

[30] Foreign Application Priority Data

Feb. 27, 1996 [JP] Japan .................. 8-002065 U

[51] Int. Cl.⁶ .................................................. F24F 3/16
[52] U.S. Cl. .................................................. 62/78; 62/303
[58] Field of Search .................. 62/303, 78, 237; 165/41, 51, 53; 261/127

[56] References Cited

U.S. PATENT DOCUMENTS 5,429,180  7/1995  Nishino et al. .................. 165/41

FOREIGN PATENT DOCUMENTS

56-909       4/1983  Japan .......................... 62/303
405221241    8/1993  Japan ............................ 62/78
438835       1/1975  U.S.S.R. ......................... 62/78

Primary Examiner—William Doerrler
Attorney, Agent, or Firm—Moonray Kojima

[57] ABSTRACT

The invention relates to an attachment for vehicle air-conditioning apparatus used in a vehicle air-conditioning apparatus for taking in external air or internal air through an air-conditioning air intake route, for feeding cleaning, aromatic or other solvent to clean the heat exchanger (evaporator) and improving the compartment environments, in which at least one solvent flow injection means is provided at the upstream side of the heat exchanger in the air-conditioning air intake route, a solvent feed route for feeding first solvent or second solvent to the injection means is provided, and the heat exchanger cleaning effect, or aromatic, deodorizing, disinfecting, or anti-mold effect may be obtained by the first or second solvent injected from the injection means, so that the compartment environments may be substantially improved.

11 Claims, 6 Drawing Sheets

ATTACHMENT FOR VEHICLE AIR-CONDITIONING APPARATUS

(b) BACKGROUND OF THE INVENTION

1. Field of the Invention

The present invention relates to an attachment for vehicle air-conditioning apparatus for improving the compartment environments by cleaning a heat exchanger (see evaporator) or feeding perfume or other solvent, in a vehicle air-conditioning apparatus for taking in external air or internal air from an air-conditioning air intake route.

2. Description of the Prior Art

The following structure was hitherto known as means for improving the compartment environments by cleaning the evaporator, preventing growth of mold and bacteria, and suppressing offensive smell.

That is, in the vehicle air-conditioning apparatus, in which a cooler housing is connected to a next stage of an internal and external air changing box having a fan incorporated inside, and an evaporator is disposed in the cooler housing, a spray port for spraying detergent is opened in part of the cooler housing, a spray nozzle of detergent container of handy type and spray type is inserted from the spray port, the pressing portion of the container is pressed by the finger of the operator, and the detergent in the container is sprayed toward the fin.

This conventional means had the following problems. More specifically, when the opening area of the spray port is set wider, the internal and external air blow in from the fan escapes outside of the air-conditioning air intake route from the spray port of the wide opening area, and hence the opening area of the spray nozzle must be narrow, and hence when inserting the spray nozzle of the container into the spray port and spraying the detergent toward the fin of the evaporator, the spray nozzle cannot be inserted deep into the air-conditioning air intake route, and the detergent is sprayed only in part of the evaporator, and prevention of growth of mold and bacteria, suppression of offensive smell, and compartment environments cannot be improved sufficiently.

(c) SUMMARY OF THE INVENTION

It is hence a primary object of the invention to present an attachment for vehicle air-conditioning apparatus characterized by comprising at least one solvent flow injection means at the upstream side of the heat exchanger in the air-conditioning air intake route, feeding detergent (first solvent), or at least one second solvent of aroma, smell suppressing (including deodorizing), bactericidal (including bacteria preventive and antibacterial), or anti-mold independent solvent, and compound solvent, to the injection means, and thereby securely and effectively cleaning the heat exchanger by the cleaning solvent injected at least from the solvent flow injection means at the upstream side of the heat exchanger, or efficiently deodorizing, bactericidal or anti-mold treating the heat exchanger by the second solvent injected from the solvent flow injection means, or presenting aromatic effect by releasing the aromatic solvent injected from the solvent flow injection means into the compartment from the air-conditioning air blowout part of the vehicle air-conditioning apparatus.

It is other object of the invention to present an attachment for vehicle air-conditioning apparatus capable of simplifying the route and reducing the number of processes of incorporating the route in the vehicle air-conditioning apparatus, by sharing the solvent feed route between the first solvent and second solvent.

It is a different object of the invention to present an attachment for vehicle air-conditioning apparatus capable of preventing unnecessary mixture of solvents, by forming independently the solvent feed routes for plural solvent flow injection means (including both plurality in a same position and plurality at different positions).

It is another object of the invention to present an attachment for vehicle air-conditioning apparatus capable of feeding the solvent at the selectively communicating side securely into the solvent flow injection means through a common route in a simple constitution, by selectively communicating a common route communicating with the solvent flow injection means with each solvent discharge part of first solvent and second solvent.

It is other different object of the invention to present an attachment for vehicle air-conditioning apparatus capable of feeding the solvent selected by selecting operation by using solvent selecting means securely into the solvent flow injection means, without detaching or attaching operation of common route in each solvent discharge part, and enhancing the controllability, by connecting individual solvent routes to each solvent discharge part of first solvent source and second solvent source, communicating the individual solvent routes to the common route, and disposing using solvent selecting means.

Further objects of the invention will be more easily understood from the following description of embodiments.

(e) DESCRIPTION OF THE PREFERRED EMBODIMENTS

Referring now to the drawings, embodiments of the invention are described in detail below.

The drawings illustrate the attachment for vehicle air-conditioning apparatus, and referring to individual constitution of the vehicle air-conditioning apparatus, first in FIG. 1, an internal and external air changeover box 3 (hereinafter called box) having an external air intake port 1 and an internal air intake port 2 is provided, and a fan 5 (blowing means) driven by a blower motor 4 is disposed in this box 3, and an internal and external air changeover door 6 (hereinafter called door) is also disposed.

At a next stage of a blower unit 7, a cooler unit 9 is connected through a communication duct 8. The cooler unit 9 has an evaporator 11 (heat exchanger) provided inside a cooler housing 16 (hereinafter called housing). A drain port 10a is formed in the housing 10 immediately beneath the downstream position of the evaporator 11. The evaporator 11 is a heat exchanger connected to refrigeration cycle, and acts to deprive the surrounding of the heat.

At a next stage of the cooler unit 9, a heater control unit 12 is consecutively connected. This unit 12 possesses a heater core, air mix door, vent door, defroster door, heat door, and mixing chamber in its inside, and it is constituted so as to blow out the air-conditioned air (cold air and hot air) to necessary positions in the compartment from the defroster outlet, vent outlet, and heat outlet, by changing over the doors.

In the vehicle air-conditioning apparatus, as an example of intermediate part of the box 3 and housing 10, the communicating duct 8 positioned at the upstream side of the evaporator 11 is provided with a nozzle 13 of relatively tall overall height as solvent flow injection means for injecting the first solvent or second solvent toward the entire region of the front side of the evaporator 11 by proper means (fitting means, screw tightening means, adhesive means).

In the box 3 outside of changeover locus a of the door 6 at the upstream side of the fan 5, a nozzle 14 is fitted as solvent flow injection means for injecting the first solvent or second solvent toward the air-conditioning air suction position of the fan 5 by proper means (fitting means, screw tightening means, adhesive means).

Figure 2:
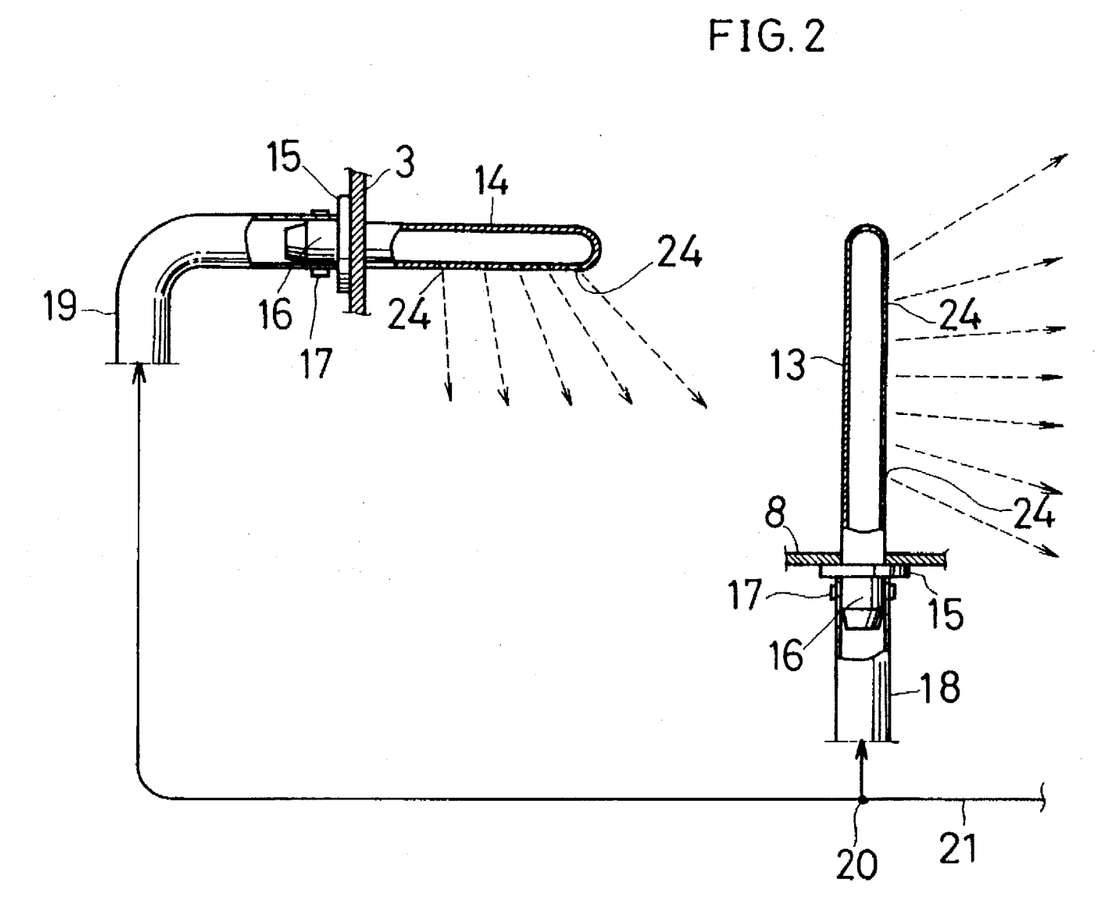
FIG. 2 is a block diagram of essential parts of the attachment shown in FIG. 1.

These nozzles 13, 14 have flange 15 and joint 16 at their base part as shown in FIG. 2, and front ends of flexible tubes 18, 19 are fitted to the joint 16 through tightening member 17 such as tightening band. The tubes 18, 19 are connected to a branch pipe 20, and a common tube 21 (common route) is fitted to the base end side of the branch pipe 20.

Figure 3:
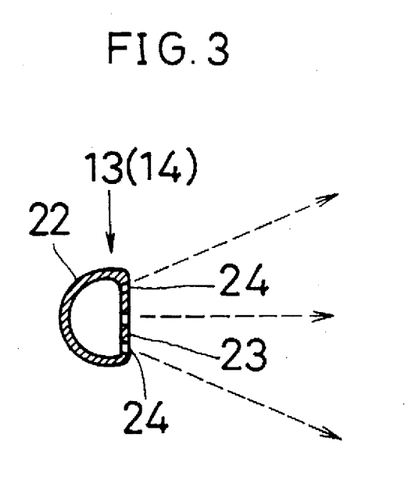
FIG. 3 is a sectional view of nozzle.

Meanwhile, the nozzles 13, 14 are formed in a semicircular form at the upstream side 22 as shown in FIG. 3, and are composed so as not to add air resistance to the wind blown by the fan 5, and the downstream side 23 is nearly flat, and at this downstream side 23, as shown in FIG. 2 and FIG. 3, multiple injection ports 24 . . . are formed so as to be directed to the entire front region of the evaporator 11 or the entire suction port of the fan 5.

Figure 1:
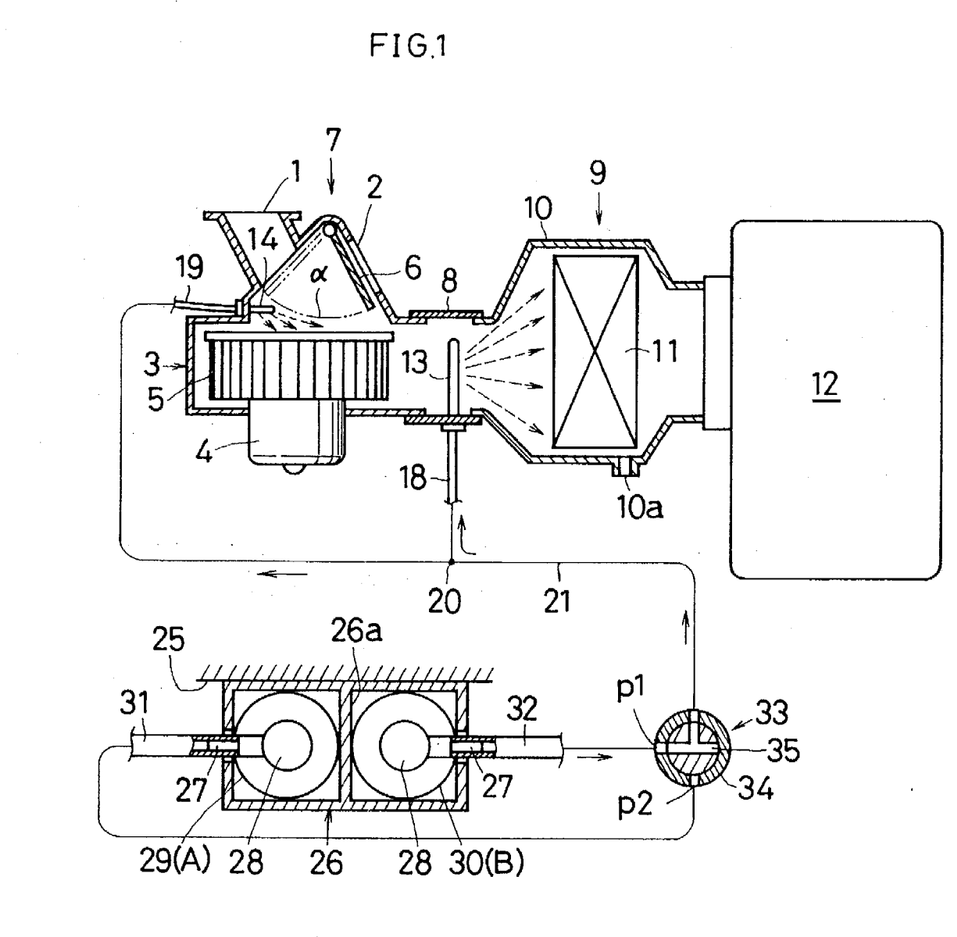
FIG. 1 is a block diagram showing an embodiment of attachment for vehicle air-conditioning apparatus of the invention.

On the other hand, in FIG. 1, at a position controllable by the driver, in a specified area of an instrument panel 25 in the compartment, a single case 26 having a partition wall 26a is provided by proper means (mounting means by clip, etc.).

Inside the case 26, as a solvent source having a solvent discharge unit 27 (hereinafter called discharge unit) and a pressing part 28 in the upper part, filling containers 29, 30 of spray type gas cylinder are accommodated so as to be exchangeable. The case 26 is formed of synthetic resin or the like.

The case 26 has a lid provided at a proper position, so that the filling containers 29, 30 can be exchanged, and the pressing part 28 can be operated.

In this embodiment, one filling container 29 is filled with cleaning solvent (first solvent), and other filling container 30 is filled with at least one second solvent, selected from the group consisting of aromatic solvent (including perfume), deodorizing solvent (including deodorant), bactericidal solvent (including bactericide and antibacterial agent), anti-old solvent, other independent solvent, and compound solvent, for example, aromatic solvent B containing bactericide. These filling containers discharge the internal solvents A and B from the solvent discharge part 27 (so-called spray nozzle) when the pressing part 28 is pressed by sealing with sealing gas.

At the discharge part 27 in the filling container 29 of the cleaning solvent A side, a flexible tube 31 is connected as individual solvent route, and at the discharge part 27 in the filling container 30 of the aromatic solvent B side, a flexible tube 32 is connected as individual solvent route.

The tubes 31, 32 communicate with the common tube 21 through a convergent part 33, and a changeover valve 34 as using solvent selecting means is provided in the convergent part 33. Instead of forming the changeover valve 34 in the convergent part 33, a valve may be interposed between the tubes 31 and 32 to compose the using solvent selecting means.

As the cleaning solvent A, for example, liquid detergent, foamed detergent (blended with a proper amount of water, phosphoric acid, Softanol 70, propylene glycol monomethylether MGF, etc.), cleaning water, chemical, bactericide, antibacterial, disinfectant or the like may be used either alone or in mixture (compound).

The elements 13 to 34 shown in FIG. 1 may be handled as kit, and may be attached later to the vehicle, or assembled preliminarily when manufacturing the vehicle.

In thus constituted attachment for the vehicle air-conditioning apparatus, the operation is described below.

To keep an aromatic effect in the compartment, as shown in FIG. 1, after communicating between the port p1 and valve passage 35 by manipulation of the changeover valve 34, the pressing part 28 in the filling container 30 of the aromatic solvent B side is pressed, when the aromatic solvent B is supplied into the tubes 18, 19 through the elements 27, 32, 34, 21, and sprayed into the air-conditioning air intake route through the nozzles 13, 14, and therefore the aromatic solvent B is released into the compartment through the air-conditioning air blow-out part of the vehicle air-conditioning apparatus by the wind blown by the fan 5 driven by the blower motor 4, so that an aromatic effect is obtained.

On the other hand, when cleaning the evaporator 11 and fan 5, after communicating between the port p2 and valve passage 35 by manipulation of the changeover valve 34, when the pressing part 28 in the filling container 29 at the cleaning solvent A side is pressed, the cleaning solvent A is supplied into the tubes 18, 19 through the elements 27, 31, 34, 21, and is sprayed into the air-conditioning air intake route through the nozzles 13, 14.

Since the cleaning solvents A from the nozzles 13, 14 are sprayed from multiple injection ports 24 uniformly toward the entire front region of the evaporator 11 and entire suction port of the fan 5, and therefore the fins of complicated shape of the evaporator 11 and fan blades of complicated shape in the fan 5 can be cleaned simultaneously nearly completely, and by this cleaning, growth of molds and bacteria can be sufficiently prevented, the offensive smell is suppressed securely, and the compartment environments can be substantially improved. The liquid after cleaning process is discharged from the drain port 10a immediately beneath the evaporator 11. If necessary, moreover, a drain hose may be connected to the drain port 10a, and the liquid after cleaning process may be discharged out of the vehicle.

Herein, when the fan 5 is driven while injecting the cleaning solvent flow from the injection ports 24 of the nozzles 13, 14, the cleaning solvent flow after cleaning the fan 5 can be fluidized and sprayed into the evaporator 11 side, and this cleaning solvent flow and the cleaning solvent flow from the nozzle 13 can reach further inside of the fins of complicated shape of the evaporator 11, so that the cleaning effect may be further enhanced.

Thus, by disposing at least one solvent flow injection means (nozzles 13, 14) at the upstream side of the heat exchanger (evaporator 11) in the air-conditioning air intake route (the route from the air intake ports 1, 2 to the evaporator 11), and supplying the first solvent (cleaning solvent A), or at least one second solvent of independent solvents such as aroma, deodorant, bactericidal and antimold agent or compound solvent, to the injection means through solvent feed route (common tube 21), the cleaning solvent A injected from the solvent flow injection means (nozzles 13, 14) is sprayed to the entire front region of the heat exchanger, thereby cleaning the heat exchanger (evaporator 11) securely and effectively, and the heat exchanger (evaporator 11) is effectively deodorized, disinfected or rid of mold by the second solvent (aromatic solvent B containing antibacterial) injected from the solvent flow injection means (nozzles 13, 14), or the aromatic solvent B injected from the solvent flow injection means (nozzles 13, 14) is released into the compartment from the air-conditioning air blow-out part of the air-conditioning apparatus, so that an aromatic effect may be obtained.

Besides, the solvent feed route is set in a common route (common tube 21) shared between the first solvent A and second solvent (aromatic solvent B containing antibacterial), and therefore by simplifying the solvent feed route, the number of mounting processes of the vehicle air-conditioning apparatus and the cost can be reduced.

Furthermore, by selecting operation of the individual solvent routes (tubes 31, 32) or the using solvent selecting means (changeover valve 34) placed in the convergent part 33, the selected solvent A or B can be adequately supplied into the solvent flow injection means (nozzles 13, 14) through the individual solvent routes, convergent part 33, and common route (common tube 21), and detaching or attaching operation of the discharge parts 27, 27 of the common route is not needed, and the controllability may be enhanced.

In addition, when solvent sources (filling containers 29, 30) are put in an exchangeable case 26, and disposed in the compartment, the solvents A, B can be supplied into the solvent flow injection means (nozzles 13, 14) by manipulation from inside of the compartment. When the solvent A or B is used up, it can be replaced with a new solvent source (filling container 29 or 30), and since the solvent sources are disposed in the compartment through the case 26, the layout may be easy.

In the constitution of forming the nozzle 13 only in one communication duct 8 to clean the evaporator 11, plural injection ports 24 are formed at both the upstream and downstream sides of the nozzle 13, and the evaporator 11 and fan 5 may be cleaned at the same time, and the nozzle 13 may be bent in a ">" form in side view.

Figure 4:
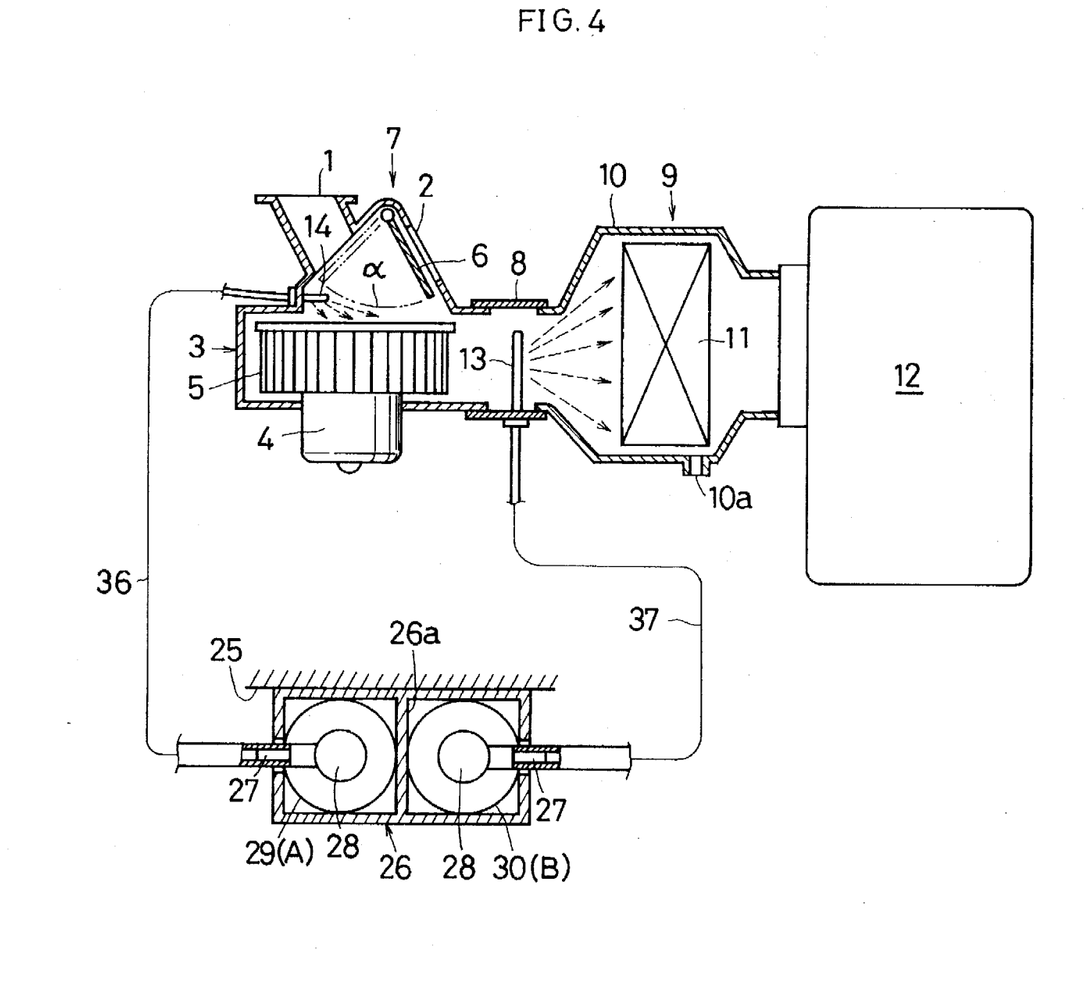
FIG. 4 is a block diagram showing other embodiment of attachment for vehicle air-conditioning apparatus of the invention.

FIG. 4 is a block diagram showing other embodiment, and in this embodiment, one nozzle 14 and a discharge part 27 in a filling container 29 of the cleaning solvent A side are connected through an independent tube 36, and other nozzle 13 and a discharge part 27 in a filling container 30 of the aromatic solvent B side are connected through other independent tube 37.

In this way, when the solvent feed routes (independent tubes 36, 37) to plural solvent flow injection means (nozzles 13, 14) are formed independently, it is effective to prevent unnecessary blending of solvents A, B. Instead of the constitution in FIG. 4, one nozzle 14 and aromatic solvent B side may be connected, and the other nozzle 13 may be connected with the cleaning solvent A side, or the two nozzles 13, 14 may be disposed parallel on a same position of the upstream side of the evaporator 11. In this embodiment, too, the actions and effects are nearly same as in the embodiment in FIG. 1 in other aspects, and same reference numerals are used in the corresponding parts in the previous drawings in FIG. 4, and detailed descriptions are omitted.

Figure 5:
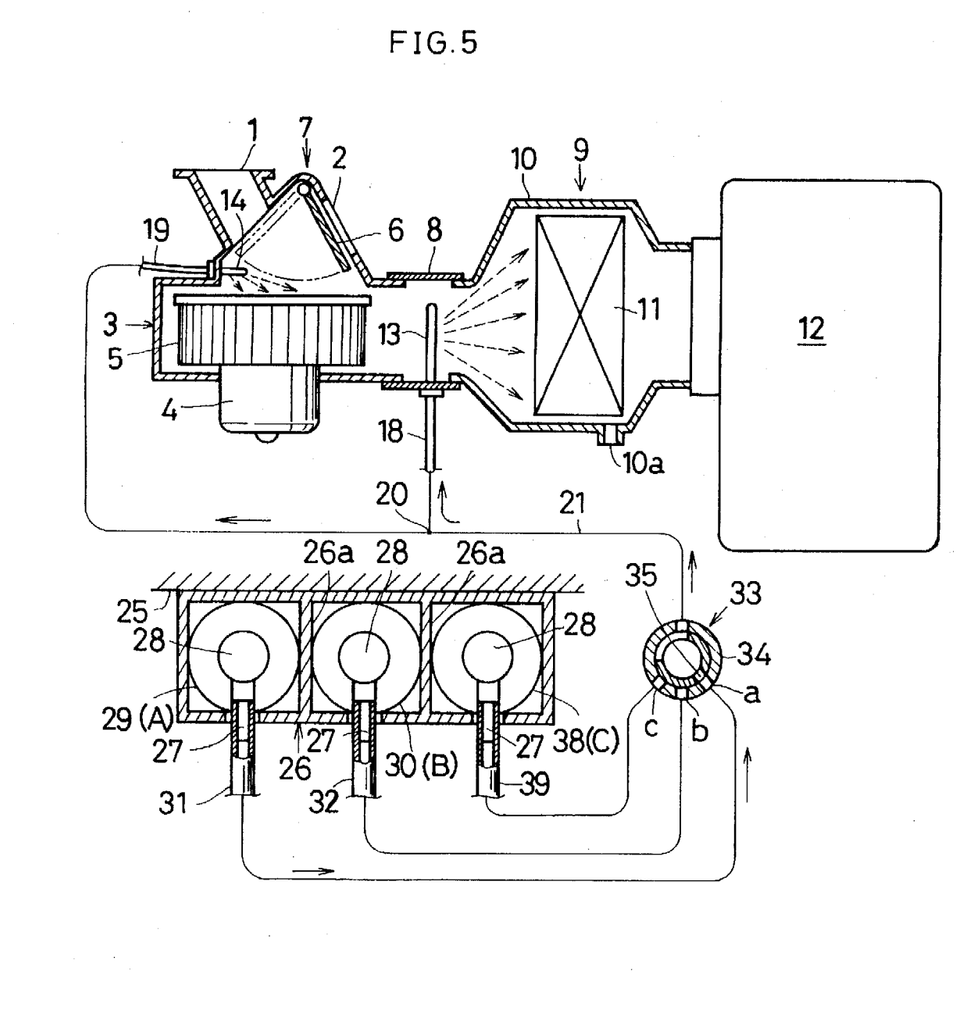
FIG. 5 is a block diagram showing a different embodiment of attachment for vehicle air-conditioning apparatus of the invention.

FIG. 5 is a block diagram showing a different embodiment, and in this embodiment, a total of three filling containers 29, 30, 38 are provided in an exchangeable case 26, and a first filling container 29 is filled with the cleaning solvent A (first solvent), a second filling container 30 is filled with aromatic solvent A containing antibacterial (second solvent), and a third filling container 38 is filled with deodorant C (second solvent) as one of other second solvents.

At discharge parts 27 . . . of the filling containers 29, 30, 38, flexible tubes 31, 32, 39 are connected as individual solvent routes, and the tubes 31, 32, 39 are joined at a convergent part 33, and the downstream side of the convergent part 33 is connected with a common tube 21, and the convergent part 33 also comprises a changeover valve 34 as using solvent selecting means.

In this way, when the valve passage 35 of the changeover valve 34 is changed over to communicate with the port a, the cleaning solvent A is supplied to the nozzles 13, 14, when communicating with port b, the aromatic solvent B is supplied to the nozzles 13, 14, and when communicating with port c, the deodorant C is supplied to the nozzles 13, 14.

In this constitution, too, the actions and effects are similar to those in the embodiment in FIG. 1, and same reference numerals are given to the corresponding parts in the previous drawings in FIG. 5 and detailed descriptions are omitted. Incidentally, the combination of the first solvent and second solvent is not limited to the illustrated example alone.

Figure 6:
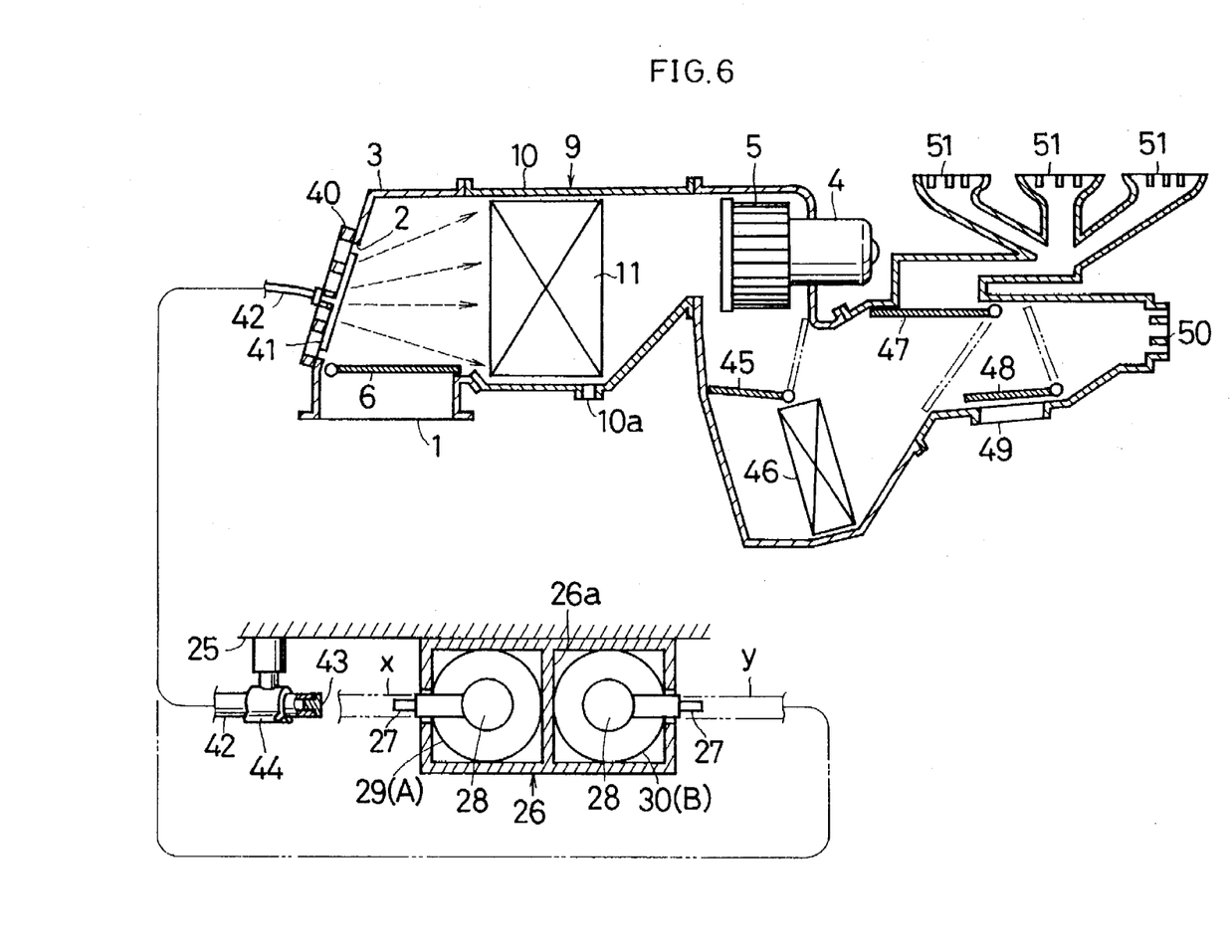
FIG. 6 is a block diagram showing a further different embodiment of attachment for vehicle air-conditioning apparatus of the invention.

FIG. 6 shows a further different embodiment, and this embodiment is applied to the vehicle air-conditioning apparatus of the type of disposing the fan 5 at the downstream side of the evaporator 11.

In this case, on the surface confronting the evaporator 11 in an outer frame 40 mounted on the outer surface of an air intake port (internal air intake port 2) of the side confronting the front surface of the evaporator 11, a nozzle 41 of a relatively long round pipe or square pipe is installed by making use of the overall length of the internal air intake port 2, and multiple injection ports 24 (see previous drawing) directing toward the entire front region of the evaporator 11 are formed on the surface of the nozzle 41 confronting the evaporator 11. The nozzle 41 may be combined in a cross form or the like.

Moreover, the front end of the nozzle 41 is connected with a flexible tube 42, and the base end side of the tube 42 is guided into the compartment, and the base end opening of the tube 42 is closed detachably by a cap member 43, and the base end side of the tube 42 is stopped in a instrument panel 25 near the case 26 by using a clip member 44, and the tube 42 is detached from the clip member 44 when necessary.

In FIG. 6, reference numeral 45 is an air mix door, 46 is a heater core, 47 is a differential, heater and cooler changeover door, 45 is a heater and cooler changeover door, 49 is a heater blow-out port, 50 is a cooler blow-out port, and a 51 is a differential blow-out port.

In this way, when cleaning the evaporator 11, the tube 42 is detached from the clip member 44, the cap member 43 is removed, the tube 42 is fitted to the discharge part 27 in the filling container 29 of the cleaning solvent A side indicated by virtual line x in FIG. 6, and when the pressing part 28 is manipulated from inside of the compartment, the door 6 is changed over to the shown state, and the cleaning solvent A is supplied to the nozzle 41, and the entire front region of the evaporator 11 can be cleaned uniformly by the cleaning solvent A sprayed from the nozzle 41.

On the other hand, to keep aromatic effect in the compartment, the tube 42 opened at the base end as indicated by virtual line y in FIG. 6 is fitted to the discharge part 27 in the filling container 30 at the aromatic solvent B side, and when the pressing part 28 is manipulated from inside of the compartment, the aromatic solvent B is supplied into the nozzle 41, so that the aromatic solvent B is released into the compartment from the air-conditioning air blow-out part by rotation of the fan 5, so that an aromatic effect may be obtained.

In this way, by selectively communicating between the common route (tube 42) which communicates with the solvent flow injection means (nozzle 41), and the discharge parts 27, 27 of the first solvent source (filling container 29) and second solvent source (filling container 30), the selected solvent A or B can be securely supplied into the solvent flow injection means (nozzle 41) through the common route (tube 42) in a simple structure. In the structure in FIG. 6, three or more filling containers may be exchangeably accommodated in the case 26.

In other points, the actions and effects are nearly same as in the preceding embodiments, and same reference numerals are given to the corresponding parts in the preceding drawings in FIG. 6, and detailed descriptions are omitted.

I claim:

1. In a vehicle air conditioning system comprising an air intake means, a blower means disposed adjacent to said air intake means, and a heat exchanger means disposed adjacent to said blower means, the improvement comprising:

nozzle means disposed adjacent to said air intake means and upstream of said blower means and said heat exchanger means;

means for holding at least one liquid; and means for selectively connecting said means for holding to said nozzle means so that said liquid is exposed as a spray to said heat exchanger means.

2. The system of claim 1, wherein said means for holding comprises means for holding two different solvents; and wherein said means for selectively connecting comprises means for commonly supplying said two different solvents to said nozzle means.

3. The system of claim 2, wherein said means for selectively connecting comprises means for supplying each of said two different solvents independently to said nozzle means.

4. The system of claim 2, wherein said means for commonly supplying comprises means for selectively supplying between said two different solvents to said nozzle means.

5. The system of claim 2, wherein said means for selectively connecting comprises means for individually connecting each of said two different solvents to said nozzle means.

6. In a vehicle air conditioning system comprising an air intake means, a blower means disposed adjacent to said air intake means, and a heat exchanger means disposed adjacent to said blower means, the improvement comprising:

a first nozzle means disposed between said air intake means and said blower means and upstream of said heat exchanger means;

a second nozzle means disposed between said blower means and said heat exchanger means and upstream of said heat exchanger means;

means for holding at least one liquid; and means for selectively connecting said means for holding to said first nozzle means and said second nozzle means so that said liquid is exposed as a spray to said heat exchanger means.

7. The system of claim 6, wherein said means for holding comprises means for holding at least two different solvents; and wherein said means for selectively connecting comprises means for commonly supplying said at least two different solvents to said first and second nozzle means.

8. The system of claim 7, wherein said means for selectively connecting comprises means for supplying each of said at least two different solvents independently to said first and second nozzle means.

9. The system of claim 7, wherein said means for commonly supplying comprises means for selectively supplying between said at least two different solvents to said first and second nozzle means.

10. The system of claim 7, wherein said means for selectively connecting comprises means for individually connecting each of said two different solvents to said first and second nozzle means.

11. In a vehicle air conditioning system comprising an air intake means, a heat exchanger means, and a blower means, the improvement comprising:

said heat exchanger means being disposed adjacent to said air intake means;

said blower means being disposed adjacent to said heat exchanger means and downstream of said heat exchanger means;

nozzle means disposed within said air intake means and upsteam of said heat exchanger means;

means for holding at least one liquid; and means for selectively applying said at least one liquid to said nozzle means so that said at least one liquid is exposed as a spray to said heat exchanger means.

* * * * *